Jan. 21, 1969 J. S. BULLER 3,422,886

RADIATION COOLER FOR USE IN SPACE

Filed July 25, 1966

Joseph S. Buller,
INVENTOR,

BY

ATTORNEY.

United States Patent Office 3,422,886
Patented Jan. 21, 1969

3,422,886
RADIATION COOLER FOR USE IN SPACE
Joseph S. Buller, Goleta, Calif., assignor to Santa Barbara Research Center, Goleta, Calif., a corporation of California
Filed July 25, 1966, Ser. No. 567,676
U.S. Cl. 165—80                                                            11 Claims
Int. Cl. F28f 7/00

ABSTRACT OF THE DISCLOSURE

A multistage radiation cooling arrangement is provided to efficiently cool a radiation detector in a vacuum condition, for example, outer space, a first support is provided for the detector which is in thermal conductive heat transfer relation with a first black body radiating surface. A plurality of radiation shields surround the detector and the first black body surface each segment of the structure being telescopically received within the other and physically spaced therefrom to inhibit conductive heat transfer. In one embodiment supporting wires maintain the spaced relation between the segments so that the vacuum existent therebetween effectively prevents heat transfer. Another embodiment fills the volume between the segments with super insulation to inhibit conductive heat transfer therebetween. Each shield is provided with a radiating black body surface adapted to be focused on dark space whereby staged radiation cooling is provided to maintain the detector at desired low temperature.

---

The invention is directed to a radiation cooler having particular utility in maintaining an appropriate radiation detector at its optimum cryogenic operating temperature.

It is well known in the art that radiation detectors have great utility in scanning the earth from an orbit position therearound, such as the relatively common weather satellites now in use.

Most of the detectors now being used require, for efficient operation, that they be maintained at an ambient temperature in the cryogenic range, for example, below 77° K. Characteristically, prior art detector coolers use stored cryogens or mechanical refrigerating devices to control detector temperature. The stored cryogen had the disadvantage of relatively short service life in that it was stored as a solid or liquid, and upon heat absorption would sublimate or evaporate to its gaseous state and dissipate in space. The detector, therefore, could only be maintained at the required temperature as long as the cryogen supply lasted. Mechanical coolers, of course, could supply continuous refrigeration over an extended period of time. They are, however, expensive in first cost, comparatively heavy, thus detracting from the useful payload an appropriate launch vehicle could carry into space. Mechanical coolers also require a relatively large power input. Additionally, mechanical cooling devices were subject to breakdown failure in operation.

Accordingly, it is a primary object of this invention to provide a radiation cooler which will efficiently maintain an associated radiation detector at its optimum operating temperature.

It is a further object of the invention to provide a radiation cooler which will maintain the required detector temperature condition without the necessity of an external power supply.

It is yet another object of the invention to provide a radiation detector cooler which is small in size and relatively lightweight and will function continuously, that is, have a virtually unlimited operating life.

Specifically, the invention incorporates, with a radiation detector, a radiation radiator adapted to focus on dark space and dissipate energy from the detector to dark space. Thus the detector is maintained at a temperature at which it will most efficiently operate. The invention incorporates a blackbody radiating surface in thermal conductive contact with the radiation detector in combination with staged radiation shielding structure surrounding same to thus insulate the radiating surface from the relatively warm surroundings of its spacecraft.

These and other advantages and features of the invention will become apparent in the course of the following description and in examination of the related drawings, wherein.

To better understand the operation of the disclosed invention it will be kept in mind that space, per se, is essentially a total vacuum without matter disposed therein and therefore may be assumed, in that condition, to be at absolute zero, that is, a 0° K. temperature level. However, in-space energy, per se, does exist by reason of the emission of radiation from heavenly bodies, i.e., stars and the like. As a result of this emitted radiation, it has been estimated that an assumed temperature level of between 4° K. and 20° K. is believed to exist in dark space.

To maintain an appropriate radiation detector at its desired temperature level, for example, 40° K., a structure is provided having an appropriate blackbody radiation surface directed toward or focused upon dark space and in thermal conductive contact with the detector itself. Additionally, the invention provides staged shielding structure conductively insulated from the primary radiating surface and its related structure. As herein used the term "conductive" refers to heat transfer between bodies by virtue of direct physical contact therebetween or via a bridging body. Minor conductive transfer as a result of the supporting wire structure hereinafter described is ignored. Each shielding stage is also conductively insulated from each other shielding stage. Each shielding stage is also provided with a blackbody radiating surface, again focused on dark space, whereby each stage is maintained at progressively lower cryogenic temperature thus minimizing radiant energy transfer to the detector and related structure.

Figure 1:
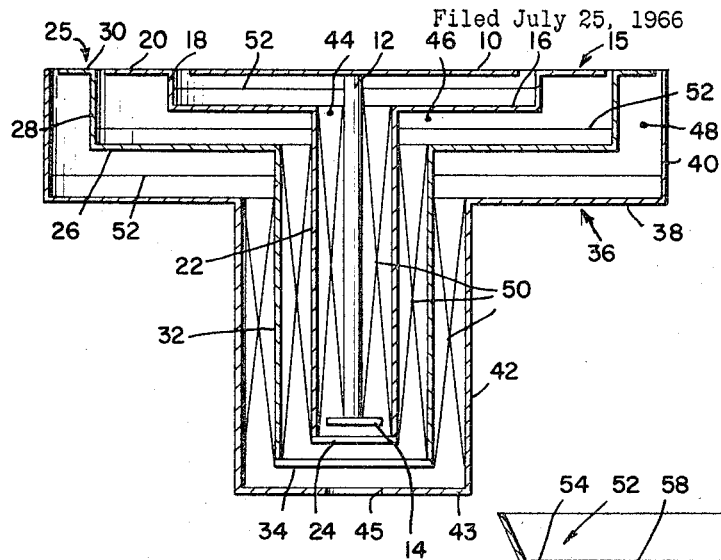
FIGURE 1 is a central vertical sectional view of the first embodiment of the invention.

A first embodiment of the invention is shown in FIG. 1. Structurally, the cooler comprises a primary blackbody radiation stage in which a plate 10, having appropriate blackening material on its surface, provides the desired blackbody radiation effect. Centrally of the plate 10 a tube 12 is mounted and extends below the plate and a radiation detector 14 is affixed to its lower end. Thus the detector 14, the tube 12 and the plate 10 are in thermal conductive association. In a preferred embodiment, the plate 10 is circular in form but other geometric configurations may be used.

A first stage radiation shield 15 is formed by plate 16 having an annular circular upstanding wall 18 and an annular circular flange 20 radially projecting from the wall. Centrally of the plate 16 a downwardly projected tube 22 telescopically receives the tube 12, and detector 14. If desired, a filter 24 may be provided to close the lower end of tube 22, the purpose of which will be hereinafter explained. The surface of flange 20, similar to plate 10, is covered with a blackening material to provide a blackbody radiation effect.

A second stage radiation shield is provided at 25 and includes plate 26 which also has an annular upstanding wall 28 again provided with a radially projecting flange 30 at its outer aspect. A tube 32 is located centrally of the plate 26 and projects downwardly telescopically receiving the tube 22. Again, a filter 34 may be provided to close the lower aspect of tube 32. The surface of flange 30 is blackened similar to flange 30.

The entire structure just described may be disposed within a housing 36 which comprises a plate 38 having an annular upstanding wall 40 around its outer edge and a downwardly projecting hollow cylinder 42 centrally of the plate 38, the latter telescopically receiving the tube 32 and earlier described structure. Additionally, the tube 42 may be closed with a plate 43 having an aperture 45 therein to pass radiation to the detector. It will be understood that the housing 36 may be adapted to be physically connected to, that is, bolted, to an appropriate spacecraft when the arrangement is in its operational situs.

In operation, it is contemplated that the device will be used in a space environment and may therefore be considered to be in a vacuum. Accordingly, the central radiation structure 10–12, the first stage radiation shield 15, the second stage radiation shield 25, and the outer housing 36 are conductively insulated from each other by the evacuated spaces 44, 46, 48 which exist therebetween. In order to physically maintain the described structure in an operating condition a plurality of supporting strands 50, 50 interconnect the cylinder 42 and tubes 32 and 22 and 12 to provide support in the direction of the major axis of the structure. Additionally, strands 52, 52 are provided to interconnect the wall 40 and tube 32, the wall 28 and tube 22, and the wall 18 and tube 12. It will thus be apparent that the strands 52 support the described structure in a plane perpendicular to the major axis of the arrangement.

It will be understood that the detector 14 must be accurately mounted with respect to the filters 24 and 34 and the aperture 45 of plate 43. Accuracy is required because of the small size of the devices here under consideration and the necessity for continuous accurate alignment, especially during the staged temperature fluctuation. With this in mind, it has been found that the strands 50 and 52 may be thin stainless steel wires which provide the proper rigidity and strength to maintain structural alignment accuracy together with minimal conductive thermal transfer between connected parts.

It has been found that the central tube 12 may be made of copper and will efficiently thermally conduct heat energy from the detector 14 to the plate 10. The radiation shields concentrically surrounding the tube 12 as well as the housing 36 may also be made of copper. However, other materials may be found to be satisfactory. Additionally, all of the structure described is preferably gold plated and highly polished to provide an efficient radiation reflective surface thereby minimizing energy transfer between the respective parts of the structure.

Additionally, where it is desired the detector 14 scan radiation in a relatively narrow spectral band or wavelength, filters 24 and 34 may be provided to reject all radiation except that in the desired spectral band. A further benefit of cooled filters 24 and 34 is the reduction of undesirable energy reaching the detector and increasing the heat load of the primary blackbody stage which is the least capable of radiating energy to space. Cooling of the filters on the first and second stages reduces the energy emitted by the filter itself due to its own temperature. This cooling is more easily accomplished by the higher temperature stages since, because of their high temperature level, they radiate more energy to space for a given physical size than a low temperature stage.

In operation it will be assumed that the device is in its space environment carried by an appropriate spacecraft, for example, an orbiting synchronous satellite. In this condition it will be mounted so that the surfaces 10, 20, and 30 are focused on dark space, and shielded from contact with direct sunlight. As noted above, dark space may be assumed to have a temperature level in the 4° to 20° K. range. Radiation from the spacecraft will be received by the housing 36 and reradiated therefrom to the second stage 25 characterized by radiation surface 30 and its related structure. The blackbody radiating surface 30 will dissipate a substantial portion of the received energy to dark space and, therefore, after a short period of time in space, will assume a lower than ambient temperature level, for example, 180° K. Some of the radiation received by stage 25 will be reradiated and captured by stage 15. Surface 20, also focused on dark space, will dissipate a substantial portion of the received energy to dark space and, in time, it and its related structure will assume a lower temperature level, for example, 89° K. The central relatively large blackbody radiant surface 10 and its connected tube 12 will thus receive little radiation from stage 25 and the energy that it dissipates to dark space will primarily result from the operation of detector 14, detector received radiation from the scanned scene and the heat created by virtue of any electrical current being passed therethrough.

This energy is conductively transmitted to plate 10 via tube 12 and the surface 10 radiates it to dark space thus cooling the detector and relates structure to its optimum temperature level, for example, 40° K.

Figure 2:
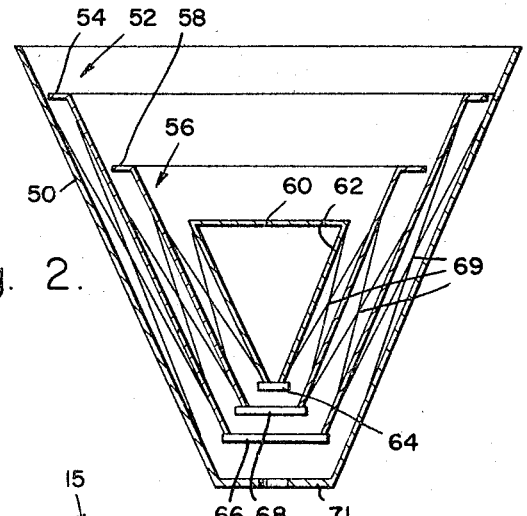
FIG. 2 is a central vertical sectional view of an alternate embodiment of the invention.

Directing attention to FIG. 2, an alternate embodiment of the structure is illustrated. In essence, this embodiment is functionally identical to that disclosed in FIG. 1, except that the structure employed utilizes a conical configuration which eliminates the need for supporting wires in a plane perpendicular to the major axis thereof. Briefly, therefore, the arrangement comprises a conical housing 50 which may be secured to the spacecraft. A second conical radiation stage 52 is provided having a blackbody radiating surface 54. Second stage 52 telescopically receives a first stage conical cooling structure 56 which is provided with a blackbody radiant surface 58. Centrally of the described structure is a primary blackbody radiation stage in which a surface 60 is conductively joined at its annular edge to thermally conducting cone 62, the latter physically supporting a detector 64 at its lower aspect. Cold filters 66, 68 and aperture plate 71 may also be used as in the prior embodiment. Wires 69, 69 support the stages and conductivity insulate the cores from each other by maintaining stage separation.

Figure 3:
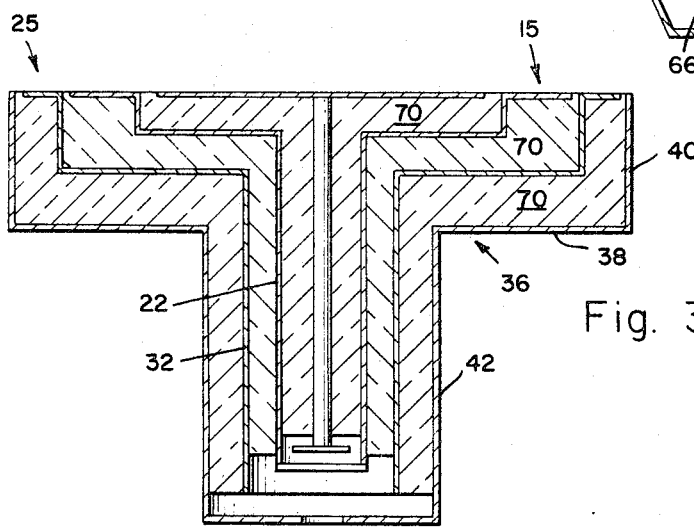
FIG. 3 is a central vertical sectional view of yet a third embodiment of the invention.

FIG. 3 is illustrative of another mode in which the structure may be embodied. The embodiment of FIG. 3 is substantially identical to the structure of FIG. 1, except that the supporting wires 50 and 52 of FIG. 1 have been eliminated and the space between the stages may be filled with super insulation 70 which conductively separates the respective stages and provides additional radiation reflective capacity to inhibit energy transfer therebetween. Any conventional super insulation may be utilized such as a plurality of layers of glass wool and alternate layers of aluminum foil or a plurality of layers of Mylar having aluminized surface coatings.

From the above it will be apparent that the invention provides a novel structure which functions to maintain the radiation detector at its proper low ambient cryogenic temperature while the detector and cooling arrangement is being carried by an appropriate spacecraft such as an orbiting satellite.

The invention has specific utility in that it requires no external power source, has unlimited service life and may be embodied in small, low-weight structures.

The invention, as disclosed, is by of illustration and may be subject to other modifications or embodiments all within the scope of the appended claims.

What is claimed is:
1. A device for cooling a supported article comprising:
an element carrying the article,
said element having a blackbody radiation surface thereon in conductive heat transfer relation with the article,
the article and the rediation surface facing in different directions, said blackbody radiation surface being adapted to radiate heat generated in the article to space, shielding means surrounding the element and the article and the radiation surface to inhibit the impingement of certain radiation on the article, said shielding means including blackbody radiation surface means, and means to inhibit conductive heat transfer between said shielding means and the element whereby cooling of the shielding means results from radiation from the blackbody radiation surface means and the article is further cooled as a result of radiation from the blackbody radiation surface.

2. A device for cooling a supported article according to claim 1 wherein:

super insulation is interposed between the shielding means and between the shielding means and the element.

3. A device for cooling a supported article according to claim 1 wherein:

a housing receives and surrounds the shielding means.

4. A device for cooling an article in a vacuum, comprising:

an article support element having a blackbody radiation surface connected thereto;

the radiation surface and the article to be cooled facing in opposite directions;

the article and the radiation surface being physically connected to provide a conductive heat transfer path therebetween;

a first radiation shield telescopically receiving and surrounding said element and surface;

a second radiating shield telescopically receiving and surrounding said first shield;

means conductively insulating the respective shields from each other and from the element and radiation surface;

other blackbody radiation surfaces on the respective shields;

the temperature of the respective shields, the element and the article being progressively lowered and cooled when the radiation surfaces are focused upon an existent temperature condition in the low cryogenic range.

5. A device for cooling an article in a vacuum according to claim 4, wherein:

the article is a radiation detector and said blackbody radiation surfaces are adapted to be focused upon dark space when the device is carried into in-space environment.

6. A device for cooling an article in a vacuum according to claim 5, and including a housing surrounding said shields.

7. A device for cooling an article in a vacuum according to claim 6, and including filters thermally connected to the respective shields and operationally aligned with said detector.

8. A device for cooling an article in a vacuum according to claim 7, wherein:

the surfaces of said element and said shields other than radiation surfaces are highly polished to provide radiation reflection.

9. A device for cooling an article in a vacuum according to claim 8, wherein:

the article supporting element, the first shield, the second shield and the housing are interconnected by thin tensioned strands for support and maintenance of relative position.

10. A device for cooling a supported article according to claim 6, wherein:

super insulation is provided between the housing and one shield, between the shields and between another shield and the element.

11. A device for cooling an article in a vacuum according to claim 4, wherein:

said shields taper outwardly from the longitudinal axis of the device as seen in side-elevational view.

References Cited

UNITED STATES PATENTS

| | | | |
|---|---|---|---|
| 2,234,122 | 3/1941 | Heck | 165—133 X |
| 2,643,022 | 6/1953 | Cornell | 220—15 |
| 2,914,915 | 12/1959 | Sziklas et al. | 165—133 X |
| 3,066,222 | 11/1962 | Poorman et al. | 62—514 X |
| 3,285,333 | 11/1966 | Johnson | 165—133 |
| 3,310,102 | 3/1967 | Trombe | 165—133 |

ROBERT A. O'LEARY, *Primary Examiner.*

A. W. DAVIS, JR., Assistant *Examiner.*

U.S. Cl. X.R.

165—133, 135; 62—467; 244—1